Aug. 7, 1923.

F. D. WILLIAMS 1,464,054

METHOD OF PRINTING MOTION PICTURES

Filed July 20, 1922

INVENTOR.
Frank D. Williams
BY Nestall and Wallace
ATTORNEYS.

Patented Aug. 7, 1923.

1,464,054

UNITED STATES PATENT OFFICE.

FRANK D. WILLIAMS, OF LOS ANGELES, CALIFORNIA.

METHOD OF PRINTING MOTION PICTURES.

Application filed July 20, 1922. Serial No. 576,260.

*To all whom it may concern:*

Be it known that I, FRANK D. WILLIAMS, a citizen of the United States, and resident of Los Angeles, in the county of Los Angeles and State of California, have invented new and useful Improvements in a Method of Printing Motion Pictures, of which the following is a specification.

This invention relates to a method of harmonizing light in a photograph and is especially applicable to motion pictures.

Photographs or negatives are often retouched to harmonize lights and to accentuate, subdue, or blend certain objects on the picture. Retouching is more especially resorted to in still photography. In motion picture work, due to the great number of pictures and their size, retouching is impracticable. My invention relates to a process for adjusting the light used in printing so as to vary the light intensity as desired at any area of the picture and thereby produce prints subduing, intensifying or blending objects or parts thereof, as desired. Such a process is especially useful in trick photography, wherein different pictures are combined to produce single pictures.

In carrying out my improved process, prints may be made in a machine having a lens, in which a negative is placed over an unexposed film. Light is projected through the lens upon the negative and film and thus a print may be made. In my process, the light projected through the film is preferably reflected light. A reflector for light is used which is preferably a surface in the nature of a wall. This surface is touched to change its reflectivity in parts, that is to reflect more or less light.

In the accompanying drawing certain apparatus is illustrated for carrying out the process. However, the process is in no way limited to utilization of the particular apparatus shown herein or to any particular apparatus.

Figure 2:
Figure 1:
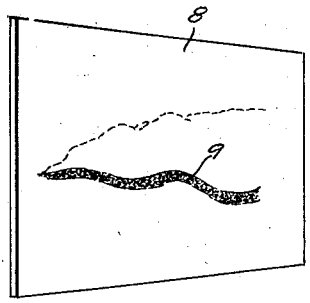
Figure 1:
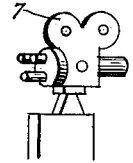

In the drawing, Fig. 1 is a perspective view of apparatus for carrying out the steps of my invention. Fig. 2 is a view of a picture taken by my process.

In producing the picture shown in Fig. 2, the camera man has taken an exterior showing the shore line of an island. The picture has been taken and printed in the usual manner. The sea is indicated by 4. At the shore line are hills 5. A beach is indicated by 6. It is found upon the picture that the beach 6 shows too light, and it is advisable to tone down or subdue the color of the beach. My invention is intended to produce a toning down. For the purpose of printing positives from the negative, a moving picture camera may be used in which the negative is superimposed upon an unexposed film. Light may then be projected through the lens of the camera upon the film and a positive print thereby made. In my improved process, a positive made from the film is projected from the camera 7 upon a background 8. Suppose the picture produced is then shown in Fig. 2. The beach will show too light. An air brush is then used to darken the background along the area on the screen showing the beach, as indicated by 9. The positive is then removed, and a negative and unexposed film inserted for printing. The light is projected through the lens from the screen upon the negative and through the latter to the unexposed film. The reflectivity of the screen will have been decreased at the beach zone by reason of subduing the latter with the touched portion. The result will be that less light will be projected through the lens upon this portion of the film and the positive printed will have a subdued tone. It is obvious that the negative may be made from this positive and prints made therefrom in the usual manner.

In the embodiment of my invention just disclosed, a white background is used with a negative for printing. The reverse operation may be resorted to wherein a positive is used to make a negative, a black background is used and touched with white. It is obvious that an object may be blotted out and other objects brought out by properly touching up the reflector background. Variations of the process for particular purposes may be employed, as desired. Negatives or positives may be toned, one process being merely the reverse of the other. My process is useful in making trick pictures.

Suppose a trick picture is to be produced in which objects are to be photographically placed in an interior. Assume, for illustrative purposes, that the objects consisting of a person standing upon a rug are to be placed within a room. To produce this effect, a picture is shot of the person standing upon the rug. A black background is used. A picture is then shot of the interior, without the person present. Negatives of the picture are developed and from these positives are printed. Positives of the interior and the object are thus obtained. If the density of the positives correspond for blending, then the negative of the objects is intensified so as to produce in effect a black silhouette. The silhouette is placed over the positive of the interior, both then being placed over an unexposed film and an exposure or print made therefrom. A print is produced having a sensitive zone outlined by the objects. Next, the positive of the object is placed over the film and an exposure made. This causes the object to be printed in the sensitive zone. Photographically objects have been placed in the interior. The film is now developed and the negative of the combined picture produced.

However, it may happen that the density of the picture of the rug does not blend properly with the interior. The rug may show too light. For properly combining the picture, the rug should be toned down. The process would then be changed as follows: A light is placed behind the positive of the objects and the objects are projected upon a white background. The background is then darkened at the section which it is desired to tone down. Thus, by means of an air brush, parts of the background upon which the rug is projected are darkened a proper amount. The background is fixed in position with respect to the printer. Printing of the picture is proceeded with as before, using a white background as a reflector. When the step is reached wherein the positive of the object and the silhouette is placed over the raw film for printing, the touched background or reflector is used. The result is that the rug after being toned down does not have as intense light transmitted therethrough, and the proper blending to produce a picture in which all of the objects shown thereon are harmonized is produced.

The invention resides in making a print by covering a sensitive film with a light transmitting medium having thereon areas of different light transmitting magnitude, and projecting light of different intensity as desired through the light transmitting medium. This light transmitting medium may be a positive or a negative as technically known in photography. In the claims, I have used the term negative in the broad sense of a light transmitting medium having the picture defined by areas of different light transmitting magnitude.

What I claim is:

1. The herein described method of printing pictures, which consists in placing a negative over a sensitive plate, projecting light through said negative by means of a reflector, and varying at will the reflectivity of the different portions of the surface of said reflector so as to vary the intensity of light projected through different portions of the negative.

2. The herein described method of printing pictures, which consists in placing a negative over a sensitive plate, projecting light through a lens upon the said negative by means of a reflector, and varying at will the reflectivity of different parts of the surface of said reflector so as to vary the intensity of light projected through different portions of the negative.

3. The herein described method of printing pictures, which consists in projecting a positive of the picture through a lens upon a reflector background, touching the reflector background upon areas to change its reflectivity as desired upon portions of the projected picture, substituting a negative and sensitive plate for said positive and printing by reflected light from said background.

In witness that I claim the foregoing I have hereunto subscribed my name this 14th day of July, 1922.

FRANK D. WILLIAMS.